(12) United States Patent
Haskell et al.

(10) Patent No.: US 6,347,116 B1
(45) Date of Patent: Feb. 12, 2002

(54) NON-LINEAR QUANTIZER FOR VIDEO CODING

(75) Inventors: Barin Geoffry Haskell, Tinton Falls, NJ (US); Atul Puri, Riverdale, NY (US); Robert Louis Schmidt, Howell, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 08/899,096

(22) Filed: Jul. 24, 1997

Related U.S. Application Data

(60) Provisional application No. 60/038,016, filed on Feb. 14, 1997.

(51) Int. Cl.⁷ ............................................. H04N 07/18
(52) U.S. Cl. ............................................. 375/240.03
(58) Field of Search ........................... 348/384, 390, 348/403, 404, 405, 607, 408; 382/236, 239, 240, 242; 375/240.01–240.1

(56) References Cited

U.S. PATENT DOCUMENTS

| | | | | |
|---|---|---|---|---|
| 4,920,414 A | | 4/1990 | Remus et al. ................ 358/133 |
| 5,170,264 A | | 12/1992 | Saito et al. .................. 358/433 |
| 5,294,974 A | * | 3/1994 | Naimpally et al. .......... 348/405 |
| 5,426,512 A | * | 6/1995 | Watson ........................ 348/405 |
| 5,434,623 A | * | 7/1995 | Coleman et al. ............. 348/405 |
| 5,473,377 A | * | 12/1995 | Kim ............................ 348/405 |
| 5,493,513 A | | 2/1996 | Keith et al. .............. 364/514 R |
| 5,543,844 A | * | 8/1996 | Mita et al. ................... 348/405 |
| 5,570,203 A | * | 10/1996 | Sukuzi et al. ............... 348/405 |
| 5,604,540 A | * | 2/1997 | Howe ......................... 348/405 |
| 5,659,362 A | * | 8/1997 | Kovac et al. ............... 348/384 |
| 5,731,837 A | * | 3/1998 | Hurst, Jr. .................... 348/403 |
| 5,822,005 A | * | 10/1998 | Horne ......................... 248/405 |
| 5,822,462 A | * | 10/1998 | Miyake ....................... 348/405 |
| 5,870,144 A | * | 2/1999 | Guerrera ..................... 348/403 |
| 5,937,098 A | * | 8/1999 | Abe ............................ 382/239 |

FOREIGN PATENT DOCUMENTS

| | | |
|---|---|---|
| EP | 0 400 756 A2 | 12/1990 |
| EP | 0 514 663 A2 | 11/1992 |
| EP | 0 517 256 A2 | 12/1992 |
| EP | 0 566 219 A2 | 10/1993 |
| EP | 0 582 819 A2 | 2/1994 |

* cited by examiner

*Primary Examiner*—Andy Rao
(74) *Attorney, Agent, or Firm*—Kenyon & Kenyon

(57) ABSTRACT

A quantizer and dequantizer for use in a video coding system that applies non linear, piece-wise linear scaling functions to video information signals based on a value of a variable quantization parameter. The quantizer and dequantizer apply different non linear, piece-wise linear scaling functions to a DC luminance signal, a DC chrominance signal and an AC chrominance signal. A code for reporting updates of the value of the quantization parameter is interpreted to require larger changes when the quantization parameter initially is large and smaller changes when the quantization parameter initially is small.

36 Claims, 2 Drawing Sheets

NON-LINEAR QUANTIZER FOR VIDEO CODING

RELATED APPLICATION

This application claims the benefit of priority afforded by provisional application Ser. No. 60/038,016 filed Feb. 14, 1997, the disclosure of which is incorporated herein.

BACKGROUND OF THE INVENTION

The present invention related to a quantizer for use in image coding.

It is known to scale discrete cosine transformation coefficients in video coding applications to conserve bandwidth. Known systems either scale by a small constant, such as divide by 8, or scale by a linear scaling factor that is twice a quantization parameter ($2 \times Q_p$). Scaling by the small constant does not achieve significant bandwidth savings. Scaling by the $2 * Q_p$ linear scaling function achieves significant bit savings, but results in poor image quality at lower and mid-level $Q_p$ values particularly in the chrominance video signals. Accordingly, there is a need in the art for a quantizer characterized by a scaling function that achieves good signal quality, and achieves bit rate savings for all values of $Q_p$ particularly for chrominance.

An encoder and decoder must use the same quantization parameter to encode and decode video information intelligibly. Known systems report changes to the quantization parameter with codes that cause changes in $Q_p$ with a uniform step size, regardless of the value of $Q_p$.

Experience teaches that, at low values of $Q_p$, changes in $Q_p$ are relatively small. However, for large values of $Q_p$, changes in $Q_p$ values are relatively large. Systems that allocate additional bits to report the larger $Q_p$ changes waste bandwidth at the lower $Q_p$ values where the large changes do not occur. However, systems that limit the number of bits available to coding $Q_p$ changes may become saturated if larger changes must be coded. Accordingly, there is a need in the art for a quantizer that reports both large and small changes in $Q_p$ with a minimum number of bits.

SUMMARY OF THE INVENTION

The disadvantages of the art are alleviated to a great extent by a quantizer that applies a non-linear scaling function based on the quantization parameter. A different scaling function applies for luminance data than chrominance data. Both scaling functions at low $Q_p$ values approximate constant scaling functions. At large $Q_p$ values, the luminance scaling function approximates a $2 * Q_p$ scaling function and the chrominance scaling function approximates a $1 * Q_p$ scaling function. The quantizer may include a non-linear scaling function for AC coefficients.

The present invention may include a way to update values of $Q_p$. Changes in $Q_p$ are reported in a fixed length code, but each code means different things based on the previous values of $Q_p$. If the previous $Q_p$ value is large, the code represents a larger change than if the previous value of $Q_p$ were small.

DETAILED DESCRIPTION

Figure 1A:
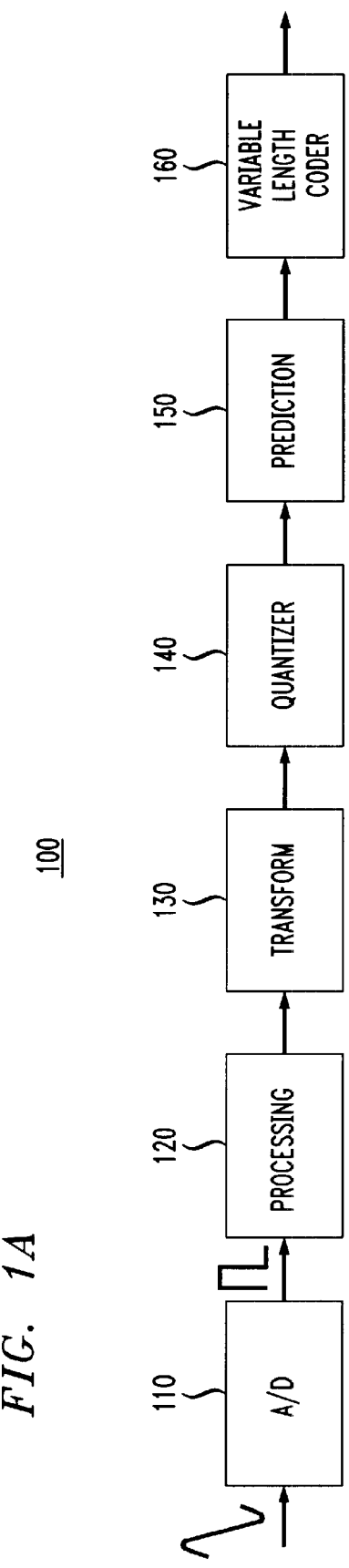
FIG. 1(a) is a block diagram of a first embodiment of an encoder 100 of the present invention.
Figure 1B:
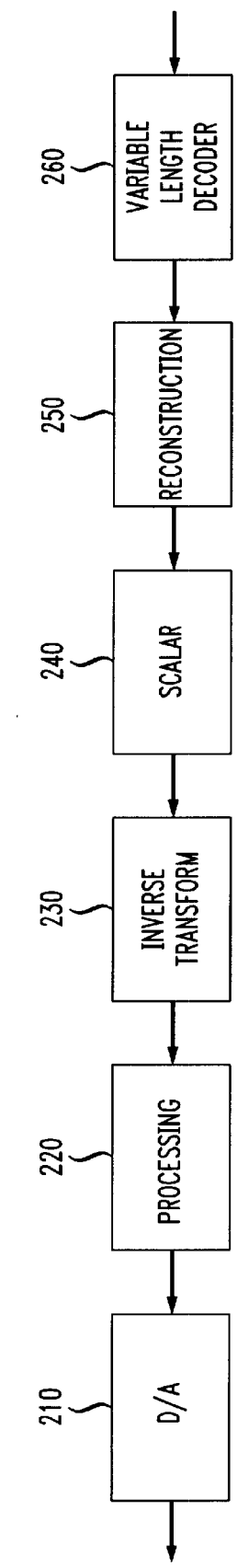
FIG. 1(b) is a block diagram of a first embodiment of a decoder 200 of the present invention.

FIG. 1 shows an encoder 100 constructed in accordance with a first embodiment of the present invention. An analog image signal is presented to the encoder 100. The image signal is sampled and converted to a digital signal by an analog to digital ("A/D") converter 110 using techniques known in the art. The A/D converter 110 generates a digital image signal for a plurality of pixels of the image. Alternatively, the image signal may be presented to the encoder 100 as a digital image signal; in this case, the A/D converter 110 is omitted.

The digital image signal is input to a processing circuit 120. The processing circuit 120 may perform a host of functions. Typically, the processing circuit 120 filters the image data and breaks the image data into a luminance signal component and two chrominance signal components. Additionally, the processing circuit 120 groups image data into blocks of data. Where the digital input signal represents information for a plurality of pixels in a scanning direction, the digital output of the processing circuit 120 represents a block of pixels, for example an 8 pixel by 8 pixel array of image data. The processing circuit 120 outputs image data on a macro block basis. A macro block typically consists of up to four blocks of luminance data and up to two blocks of chrominance data. The processing circuit 120 may also perform additional functions, such as filtering, to suit individual design criteria.

The output of the processing circuit 120 is input to a transform circuit 130. The transform circuit 130 performs a transformation of the image data, such as discrete cosine transform ("DCT") coding, from the pixel domain to a domain of coefficients. A block of 64 pixels is transformed to a block of 64 coefficients. Coefficients output by DCT coding include a single DC coefficient and 63 AC coefficients, few of which are non-zero. The transform circuit 130 outputs blocks of coefficients organized into macro blocks.

A quantizer 140 scales the DC and AC coefficients generated by the prediction circuit 150 according to a non-linear scaling function governed by a variable quantization parameter ($Q_p$). The quantization parameter is a value determined by the bit rate of the channel, the resolution of the image being coded, the type of image coding (intra or inter) and other factors that affect a number of bits that may be allocated to coding of the macro block. $Q_p$ is updated on a macro block by macro block basis; changes in $Q_p$ are reported in an output bitstream. In MPEG coding, $Q_p$ takes on values between 1 and 31. The quantizer 140 reduces bandwidth of the image signal by reducing a number of quantization levels available to encoding the signals. Many small coefficients input to the quantizer 140 are divided down and truncated to zero. The scaled signals are output from the quantizer 140.

The output of the quantizer 140 is input to a prediction circuit 150. The prediction circuit 150 performs gradient prediction analysis to predict the DC coefficient of the block. The prediction circuit 150 may pass the AC coefficients generated by the transform circuit 130 or, alternatively, may predict AC coefficients of the block. In a preferred mode of operation, the prediction circuit 150 selects between modes of predicting or passing AC coefficients; in this case, the prediction circuit 150 generates an AC prediction flag to identify a mode of operation. The prediction circuit 150 outputs DC coefficient signals and AC coefficient signals (representing either AC coefficients or AC residuals) on a macro block basis and, on a macro block basis optionally, an AC prediction flag.

A variable length coder 160 encodes the output of the quantizer 140. The variable length coder 160 typically is a Huffman encoder that performs run length coding on the scaled signals. A bitstream output from the variable length coder 160 may be transmitted, stored, or put to other uses as are known in the art.

A decoder 200 performs operations that undo the encoding operation described above. A variable length decoder 260 analyzes the bitstream using a complementary process to recover a scaled signal. If a Huffman encoder were used by the encoder 160, a Huffman decoder 260 is used.

A reconstruction circuit 250 performs the identical gradient analysis performed in the prediction circuit 150. The DC residual signal is identified and added to a predicted coefficient to obtain a DC coefficient. Optionally, the reconstruction circuit 250 may identify the AC prediction flag and, based on the status of that flag, interprets the AC information as either AC coefficient information or AC residual information. In the event that AC residual information is present, the reconstruction circuit 250 adds the residual signals to corresponding predicted signals to obtain AC coefficients. The reconstruction circuit 250 outputs coefficient signals.

A dequantization circuit 240 multiplies the recovered signals by the same scaler values used at the quantizer 140. Of course, those coefficients divided down to zero are not recovered.

An inverse transformation circuit 230 performs the inverse transformation applied by the transform circuit 130 of encoder 100. If DCT transformation were performed, an inverse DCT transformation is applied. So, too, with subband coding. The inverse transformation circuit 230 transforms the coefficient information back to the pixel domain.

A processing circuit 220 combines luminance and chrominance signals and may perform such optional features as are desired in particular application. The processing circuit 220 outputs digital signals of pixels ready to be displayed. At this point the signals are fit for display on a digital monitor. If necessary to fit a particular application, the signals may be converted by a digital to analog converter 210 for display on an analog display.

The present invention achieves bit rate savings by applying a non-linear scaler function at the quantizer 140 to obtain bit rate savings at high $Q_p$ levels but ensure high video quality at low $Q_p$ levels. The quantizer 140 applies different scaler functions depending upon the type of data being quantized (luminance or chrominance), the type of coefficient being quantized (DC or AC) and the type of coding (inter or intra) being performed.

Non-Linear Quantization of DC Coefficients for Luminance and Chrominance

For DC coefficient information, the scaler functions vary with $Q_p$. Different piece-wise linear scaler functions are applied to DC luminance and DC chrominance signals. To minimize objectionable artifacts within the chrominance signal, the DC chrominance scaler is smaller than the DC luminance scaler for all $Q_p$ values.

The DC luminance scaler function for low $Q_p$ values is a constant. For large $Q_p$ levels, the DC luminance scaler function approximates a $2*Q_p$ function. The inventors obtained through experimentation the DC scaler function shown in Table 1 below, used in an embodiment of the invention.

The DC chrominance scaler function is also at a constant at low values $Q_p$. At high $Q_p$ values, the DC chrominance scaler function approximates a linear scaler function in $Q_p$. The inventors obtained through experimentation the DC scaler function for chrominance signals shown in Table 1 below, used in a preferred embodiment.

TABLE 1

| Component | DC Scaler for Quantizer ($Q_p$) Range | | | |
|---|---|---|---|---|
| | 1 through 4 | 5 through 8 | 9 through 24 | 25 through 31 |
| Luminance | 8 | $2*Q_p$ | $Q_p + 8$ | $2*Q_p - 16$ |
| Chrominance | 8 | $(Q_p + 13)/2$ | $(Q_p + 13)/2$ | $Q_p - 6$ |

Rather than compute the DC scaler for each value of $Q_p$, further efficiencies may be obtained by storing the DC scaler functions for luminance and chrominance for all values of $Q_p$ in a memory table at the quantizer 140. In this event, the quantizer 140 includes a small memory of DC scales for luminance and chrominance that may be indexed by $Q_p$ as shown in Table 2 below.

TABLE 2

| $Q_p$ | DC Scaler for Luminance | DC Scaler for Chrominance |
|---|---|---|
| 1 | 8 | 8 |
| 2 | 8 | 8 |
| 3 | 8 | 8 |
| 4 | 8 | 8 |
| 5 | 10 | 9 |
| 6 | 12 | 9 |
| 7 | 14 | 10 |
| 8 | 16 | 10 |
| 9 | 17 | 11 |
| 10 | 18 | 11 |
| 11 | 19 | 12 |
| 12 | 20 | 12 |
| 13 | 21 | 13 |
| 14 | 22 | 13 |
| 15 | 23 | 14 |
| 16 | 24 | 14 |
| 17 | 25 | 15 |
| 18 | 26 | 15 |
| 19 | 27 | 16 |
| 20 | 28 | 16 |
| 21 | 29 | 17 |
| 22 | 30 | 17 |
| 23 | 31 | 18 |
| 24 | 32 | 18 |
| 25 | 34 | 19 |
| 26 | 36 | 20 |
| 27 | 28 | 21 |
| 28 | 40 | 22 |
| 29 | 42 | 23 |
| 30 | 44 | 24 |
| 31 | 46 | 25 |

In operation, the transform circuit 130 outputs macro blocks of data to the quantizer 140. Each macro block contains as many as four blocks of luminance data and two blocks of chrominance data. A single $Q_p$ value is used for the macro block. $Q_p$ is updated on a macro block by macro block basis.

Based on the value of $Q_p$, the quantizer 140 recalls a DC scaling factor for luminance and a DC scaling factor for chrominance determined by the scaling functions at the value of $Q_p$. For each luminance block, the quantizer 140 generates a DC lum level signal according to:

DC lum level=DC lum coefficient/DC Scaler for Luminance.

For each chrominance block, the quantizer 140 generates a DC chrom level signal according to:

Chrom DC level=Chrom DC coefficient/DC Scaler for Chrominance.

The quantizer 140 outputs each DC lum level signal and each DC chrom level signal.

Figure 2:
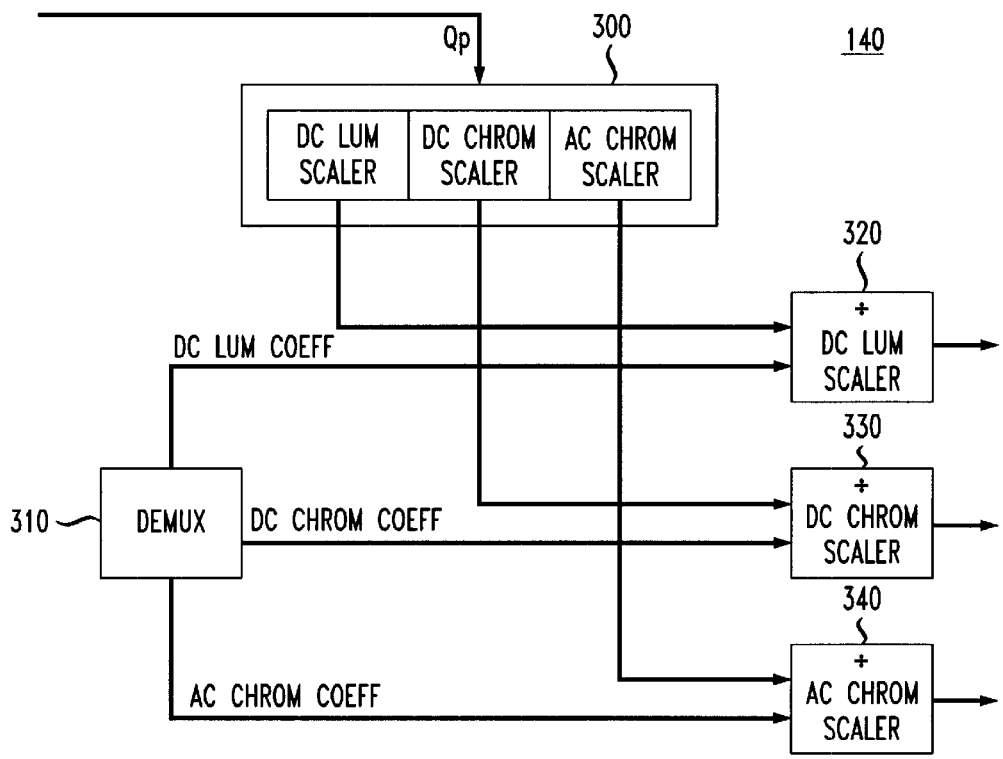
FIG. 2 is a block diagram of a portion of the quantizer of FIG. 1.

The non-linear DC scaling functions of the quantizer 140 may be implemented in hardware as shown in FIG. 2. The $Q_p$ signal is input to a memory 300 that stores the scaler factors defined by the DC luminance and DC chrominance scaler functions. The scaler table 300 may be substituted by a processor (not shown) that computes the scaler factors according to the $Q_p$ value. DC luminance and DC chrominance signals from the transform circuit 130 are isolated by a demultiplexer 310 and routed to respective luminance and chrominance division circuits 320 and 330. The DC lum level and DC chrom level signals are generated by these division circuits.

At the decoder 200, the dequantization circuit 240 performs an inverse quantization operation with the same piece-wise linear scaling functions. Based on the $Q_p$ value of the immediately preceding macro block and any $Q_p$ update reported in the incoming bitstream, the dequantization circuit 240 recalls appropriate scaling factors for DC luminance and DC chrominance signals. For each luminance block, the dequantization circuit 240 generates a luminance DC coefficient according to:

Lum DC coefficient=DC Lum Level*DC Scaler for Luminance.

For each chrominance block, the scaling circuit 240 generates a DC coefficient according to:

Chrom DC coefficient=Chrom DC Level*DC Scaler for Chrominance.

The dequantization circuit 240 outputs the reconstructed luminance and chrominance coefficients.

Figure 3:
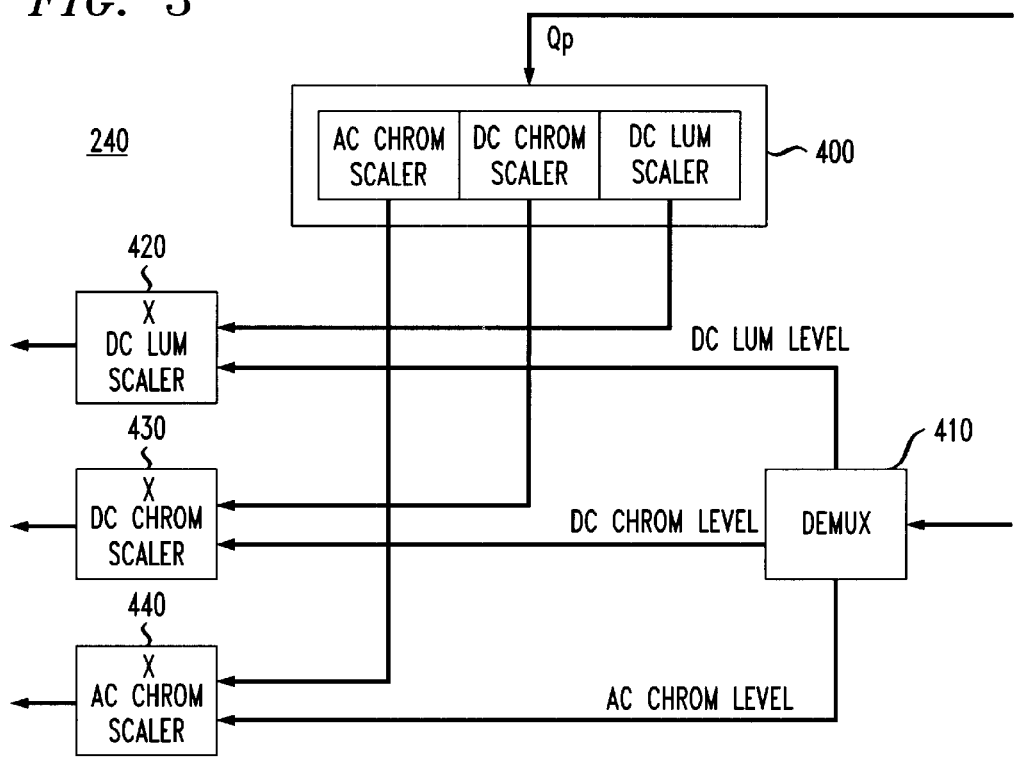
FIG. 3 is a block diagram of a portion of the scaling circuit of FIG. 1.

The non-linear DC scaling functions of the dequantization circuit 240 may be implemented in hardware as shown in FIG. 3. The $Q_p$ signal is input to a memory 400 that stores the scaler factors defined by the DC luminance and DC chrominance scaler functions. The scaler table 400 may be substituted by a processor (not shown) that computes the scaler factors according to the $Q_p$ signal. DC lum level and DC chrom level signals from the variable length encoder 260 are isolated by a demultiplexer 410 and routed to respective luminance and chrominance multiplication circuits 420 and 430. DC luminance coefficients and DC chrominance coefficients are generated by these multiplication circuits.

The non-linear DC scaling factors described above are appropriate to both intra and inter coding operations. However, experience teaches that DC coefficients obtained from inter coding often are near zero. When quantized even by a constant scaling factor, the DC coefficients obtained from inter coding often are truncated to zero. Accordingly, to reduce complexity in a preferred embodiment, the non-linear scaling function may be disabled during inter coding operations. The DC coefficients obtained from inter coding may be quantized in a manner similar to the quantization of AC coefficients, discussed below.

The non-linear DC scaling functions maintain high coding quality at low $Q_p$ values and achieve significant bit rate savings at high $Q_p$ values. The quantizer 140 and dequantization circuit 240 of the present invention may find use in applications where image quality is a more significant consideration than bit rate savings. Accordingly, in a preferred embodiment, the quantizer 140 and scaler circuit 240 may have two modes of operation: A first mode applying non-linear scaling functions based on values of $Q_p$ as described above, and a second mode applying a constant scaling factor (such as divide by 8) or even one of a plurality of constant scaling factors (such as divide by 8, 4, 2 or 1). In this embodiment, the quantizer 140 generates a scaler flag signal identifying which mode of operation is being used. The dequantization circuit 240, upon receipt of the scaler flag signal, invokes an appropriate mode of operation to generate coefficients. The scaler flag signal may be a one bit signal when discriminating among the two modes, but may be larger when discriminating among the two modes and additionally identifying which of constant scaling factors is invoked. Non-Linear Quantization of Chrominance Coefficient for Inter Coded Blocks In inter coding, both DC and AC coefficients of chrominance blocks may be close to zero. Coding of such coefficients with non-linear scaling functions may improve coding quality of the chrominance signal. Additionally, the non-linear scaling functions of this section may be applied to AC coefficients of chrominance blocks in intra coding to achieve coding efficiencies.

The non-linear scaling function for AC chrominance coefficients is piece-wise linear and based on $Q_p$ values. At low values for $Q_p$, the non-linear scaling function for AC is a constant value, almost half of the level of the scaling function for DC chrominance signals. At high levels for $Q_p$, the AC scaling function approximates a $Q_p/2$ line. At intermediate levels, the AC scaling function approximates a $Q_p/4$ line. In one preferred embodiment, the AC scaling function for chrominance was derived experimentally as shown in Table 3 below:

TABLE 3

| Component | Quantizer for Chrominance when $Q_p$ in Range | | | |
|---|---|---|---|---|
| | 1 through 4 | 5 through 8 | 9 through 24 | 25 through 31 |
| Chrominance | 4 | $(Q_p + 13)/4$ | $(Q_p + 13)/4$ | $(Q_p - 6)/2$ |

The AC scaling factors for chrominance also may be stored in the quantizer 140 in a memory table indexed by $Q_p$.

During coding, the quantizer 140 recalls or computes a scaling factor for AC coefficients based on the value of $Q_p$. For each chrominance AC coefficient, the quantizer 140 generates a corresponding chrominance AC level signal according to:

Chrom AC level=Chrom AC coefficient/Quantizer for Chrominance.

The quantizer 140 outputs the Chrom AC level signals for the AC coefficients.

The non-linear scaling functions for AC chrominance coefficients may be implemented in hardware, also shown in FIG. 2. The scaler table 300 stores the AC chrominance scaler values indexed by $Q_p$. If scaler table 300 is substituted by a processor, the processor computes the AC chrominance scaler values according to the $Q_p$ value. AC chrominance signals from the transform circuit 140 are isolated by a demultiplexer 310 and routed to an AC division circuit 340. The AC chrom level signals are generated by the division circuit 340.

During decoding, the dequantization circuit 240 recalls the AC scaling factor for chrominance based on the value of $Q_p$ used for the immediately previous macro block and any $Q_p$ update provided in the incoming bitstream. For each AC chrominance level signal, the scaling circuit 240 reconstructs a corresponding AC chrominance coefficient according to:

Chrom AC coefficient=Chrom AC Level*Quantizer for Chrominance.

The scaling circuit 240 outputs the reconstructed chrominance AC coefficients.

The scaling circuit's non-linear AC scaling functions may be implemented in hardware, also shown in FIG. 3. The scaler table 400 stores the AC chrominance scaler values indexed by $Q_p$. If scaler table 400 is substituted by a processor, the processor computes the AC scaler value according to the $Q_p$ signal. AC chrom level signals from the variable length encoder 160 are isolated by a demultiplexer 410 and routed to an AC multiplication circuit 440. The AC coefficients are generated by the multiplication circuit 440.

Quantizer Update

The encoder 100 and decoder 200 each must use the same $Q_p$ value for video signals to be encoded and decoded intelligibly. The encoder 100 may change a value of $Q_p$ as frequently as every macro block. When the encoder 100 changes $Q_p$, it reports the change in a $Q_p$ update signal in the output bitstream.

The present invention provides for an improved method of reporting updated $Q_p$ values to the decoder 200. For each $Q_p$ update, the magnitude of the $Q_p$ adjustment depends not only on the update signal but also the previous value of $Q_p$. A given $Q_p$ update signal at a large value of $Q_p$ results in a relatively large change in $Q_p$. The same $Q_p$ update signal at a small value of $Q_p$ results in a smaller change in $Q_p$. The following Table 4 demonstrates $Q_p$ adjustments made based on the $Q_p$ update signal and the value of $Q_p$ in one preferred embodiment of the invention.

TABLE 4

| DQuant | Qp Change Based on Qp Value | | | |
| --- | --- | --- | --- | --- |
| Code | 1 through 6 | 7 through 13 | 14 through 21 | 22 through 31 |
| 00 | −1 | −1 | −2 | −3 |
| 01 | −2 | −3 | −4 | −5 |
| 10 | 1 | 1 | 2 | 3 |
| 11 | 2 | 3 | 4 | 5 |

Providing variable step sizes for $Q_p$ updates based on the value of $Q_p$ provides resistance to saturation for large changes of $Q_p$ at the encoder 100. The variable step sizes provide increased flexibility without requiring additional overhead because the previous value of $Q_p$ is known at the decoder 200 and need not be reported in the bitstream.

We claim:

1. A quantizer for scaling a video information signal comprising:
   a scaling factor generator that generates a scaler based on an at least three-segment piece-wise linear transformation of a received quantization parameter $Q_p$, and
   a divider for dividing the video information signal by the scaler.

2. The quantizer of claim 1, wherein the scaling factor generator includes a memory in which the scalers are stored.

3. The quantizer of claim 1, wherein the scaling factor generator is a processor that computes the scalers.

4. The quantizer of claim 1, wherein:
   the video information contains luminance information,
   the scaling factor generator generates a luminance scaler,
   the divider divides the luminance information by the luminance scaler and generates a luminance level signal therefrom.

5. The quantizer of claim 4, wherein the luminance scaler is generated from a piece-wise linear luminance scaling function based on the quantization parameter $Q_p$ and wherein the luminance scaling function equals 8 whenever the quantization parameter $Q_2$ falls within the values 1 through 4, inclusive;
   wherein the luminance scaling function equals $(2*Q_p)$ whenever the quantization parameter $Q_p$ falls within the values 5 through 8, inclusive; and
   wherein the luminance scaling function equals $(Q_p+8)$ whenever the quantization parameter $Q_p$ falls within the values 9 through 24, inclusive, and wherein the luminance scaling function equals $(2*Q_p-16)$ whenever the quantization parameter $Q_p$ falls within the values 25 through 31, inclusive.

6. The quantizer of claim 1, wherein:
   the video information contains DC chrominance information,
   the scaling factor generator generates a chrominance scaler, and the divider divides the DC chrominance information by the chrominance scaler and generates a chrominance level signal therefrom.

7. The quantizer of claim 6, wherein the chrominance scaler is generated from a piece-wise linear chrominance scaling function based on the quantization parameter $Q_p$, and
   wherein the chrominance scaling function equals 8 whenever the quantization parameter $Q_p$ falls within the values 1 through 4 inclusive;
   wherein the chrominance scaling function equals $(Q_p+13)/2$ whenever the quantization parameter $Q_p$, falls within the values 5 through 24, inclusive; and
   wherein the chrominance scaling function equals $(Q_p-6)$ whenever the quantization parameter $Q_p$, falls within the values 25 through 31, inclusive.

8. The quantizer of claim 1, wherein:
   the video information contains luminance and chrominance information,
   the scaling factor generator generates a luminance scaler and a chrominance scaler by respective at least three-segment piece-wise linear transformations of the quantization parameter, and
   the divider comprises:
   a first divider that divides the luminance information by the luminance scaler and generates a luminance level signal therefrom, and
   a second divider that divides the chrominance information by the chrominance scaler and generates a chrominance level signal therefrom.

9. The quantizer of claim 8, wherein
   the luminance scaler is generated from an at least three-segment piece-wise linear transformation of the quantization parameter,
   the chrominance scaler is generated from an at least three-segment piece-wise linear transformation of the quantization parameter, and
   for all values of the quantization parameter, the chrominance scaler is less than or equal to the luminance scaler.

10. The quantizer of claim 1, wherein:
    the video information contains AC chrominance information,
    the scaling factor generator generates an AC chrominance scaler, and
    the divider divides the AC chrominance information by the AC chrominance scaler and generates an AC chrominance level signal therefrom.

11. The quantizer of claim 10, wherein the AC chrominance scaler is generated from an a piece-wise linear AC chrominance scaling function based on the quantization parameter $Q_p$, and wherein the AC chrominance scaling function equals 4 whenever the quantization parameter $Q_p$, falls within the values 1 through 4, inclusive;

wherein the AC chrominance scaling function equals $(Q_p+13)/4$ whenever the quantization parameter $Q_p$ fills within the values 5 through 24, inclusive; and wherein the AC chrominance scaling fiction equals $(Q_p-6)/2$ whenever the quantization parameter $Q_p$ falls within the values 25 through 31, inclusive.

12. A dequantizer for scaling a signal containing a quantized video information signal comprising:

a scaling factor generator that generates a scaler based on an at least three-segment piece-wise linear transformation of a received quantization parameter $Q_p$, and a multiplier for multiplying the quantized video information signal by the scaler.

13. The dequantizer of claim 12, wherein the scaling factor generator includes a memory in which the scalers are stored.

14. The dequantizer of claim 12, wherein the scaling factor generator is a processor that computes the scalers.

15. The dequantizer of claim 12, wherein:

the quantized video information contains a luminance level signal, the scaling factor generator generates a luminance scaler, and the multiplier multiplies the luminance level signal by the luminance scaler and generates a luminance information signal therefrom.

16. The dequantizer of claim 15, wherein the luminance scaler is generated from a piece-wise linear luminance scaling function based on the quantization parameter $Q_p$, and wherein the luminance scaling function equals 8 whenever the quantization parameter $Q_p$, falls within the values 1 through 4, inclusive, wherein the luminance scaling function equals $(2*Q_p)$ whenever the quantization parameter falls within the values 5 through 8, inclusive; and wherein the luminance scaling function equals $(Q_p+8)$ whenever the quantization parameter $Q_p$ falls within the values 9 through 24, inclusive; and wherein the luminance scaling function equals $(2*Q_p-16)$ whenever the quantization parameter $Q_p$ fills within the values 25 through 31, inclusive.

17. The dequantizer of claim 12, wherein:

the quantizer video information contains DC chrominance level signal, the scaling factor generator generates a chrominance scaler, and the multiplier multiplies the DC chrominance level signal by the chrominance scaler and generates a DC chrominance information signal therefrom.

18. The dequantizer of claim 17, wherein the chrominance scaler is generated from a piece-wise linear chrominance scaling function based on the quantization parameter $Q_p$, and wherein the chrominance scaling function equals 8 whenever the quantization parameter $Q_p$ falls within the values 1 through 4, inclusive;

wherein the chrominance scaling function equals $(Q_p+13)/2$ whenever the quantization parameter $Q_p$ falls within the values 5 through 24, inclusive; and wherein the chrominance scaling function equals $(Q_p-6)$ whenever the quantization parameter $Q_p$ falls within the values 25 through 31, inclusive.

19. The dequantizer of claim 12, wherein:

the video information contains a luminance level signal and chrominance level signal;

the scaling factor generator generates a luminance scaler and a chrominance scaler by respective at least three-segment piece-wise linear transformation of the quantization parameter; and the multiplier comprises:

a first multiplier that multiplies the luminance level signal with by the luminance scaler and generates a luminance information signal therefrom, and a second multiplier that multiplies the chrominance level signal by the chrominance scaler and generates a chrominance information signal therefrom.

20. The dequantizer of claim 19, wherein the luminance scaler is generated from an at least three-segment piece-wise linear transformation of the quantization parameter, the chrome scaler is generated from an at least three-segment piece-wise linear transformation of the quantization parameter, and for all values of the quantization parameter, the chrominance scaler is less than or equal to the luminance scaler.

21. The dequantizer of claim 12, wherein:

the quantized video information contains an AC chrominance level signal, the scaling factor generator generates an AC chrominance scaler, and the multiplier multiples the AC chrominance level signal by the AC chrominance scaler and generates an AC chrominance information signal therefrom.

22. The dequantizer of claim 21, wherein the AC chrominance scaler is generated from a piece-wise linear AC chrominance scaling function based on a quantization parameter $Q_p$, and wherein the AC chrominance scaling function equals 4 whenever the quantization parameter $Q_p$ falls within the values 1 through 4, inclusive;

wherein the AC chrominance scaling function equals $(Q_p+13)/4$ whenever the quantization parameter $Q_p$ falls within the values 5 through 24, inclusive and wherein the AC chrominance scaling function equals $(Q_p-6)/2$ whenever the quantization parameter falls within the values 25 through 31, inclusive.

23. A method of quantizing a video information signal, comprising the steps of:

generating a scaler based on an at least three-segment piece-wise linear transformation of a quantization parameter $Q_p$ received with respect to the video information, dividing the video information signal by the scaler, and outputting the divided video information signal.

24. A method of dequantizing a quantized video information signal, said video information signal characterized by a plurality of macro blocks, each macro block quantized according to a respective quantization parameter, the method comprising the steps of:

receiving the quantized video information signal identifying the macro blocks, identifying a quantization parameter update from the quantized video information signal, generating a quantization parameter change based on the quantization parameter and the quantization parameter update, generating a scaler for the macro block based on an at least three-segment piece-wise linear transformation of the quantization parameter and the quantization parameter change, and multiplying quantized video information of the macro block by the scaler to obtain dequantized video information.

25. An encoder for encoding video signals, comprising:

a processing circuit that generates blocks of video data from the video information signal, a transform circuit that generates video coefficients representative of the blocks of video data, a quantizer circuit that receives a quantization parameter and quantizes the video coefficients according to an at least three-segment piece-wise linear transformation of the quantization parameter, and a variable length coder that generates a variable length code based on the quantized video coefficients.

26. A decoder for decoding encoded video signals, comprising:

a variable length decoder that generates quantized video coefficients from variable length coded contained within the encoded video signals, a dequantizer circuit that identifies a quantization parameter associated with the video information and dequantizes the video coefficients according to an at least three-segment piece-wise linear transformation of the quantization parameter, an inverse transform circuit that transforms the dequantized video coefficients into blocks of video data, and a processing circuit that generates a video signal from the blocks of video data.

27. The quantizer of claim 1, wherein the scaler is based solely upon the transformation.

28. The dequantizer of claim 12, wherein the scaler is based solely upon the transformation.

29. A method of generating a dequantized DC luminance coefficient from a quantized DC luminance value, comprising:

retrieving a DC luminance scaler from an at least three-segment piece-wise linear luminance quantizing function bawd on a quantization parameter ($Q_p$); and generating the DC luminance coefficient by multiplying the quantized DC luminance value by the DC luminance scaler.

30. The method of claim 29, wherein a relationship between the DC luminance scaler and the quantization parameter $Q_p$ is given by Table 1.

31. The method of claim 29, wherein the DC luminance value is a member of an intra coded block of video data.

32. The method of claim 29, further comprising receiving the quantization parameter and the DC luminance value from a channel.

33. A method of generating a dequantized DC chrominance coefficient from a quantized DC chrominance value, comprising:

retrieving a DC chrominance scaler from an at least three-segment piece-wise linear luminance quantizing function based on a quantization parameter ($Q_p$); and generating the DC chrominance coefficient by multiplying the quantized DC chrominance value by the DC chrominance scaler.

34. The method of claim 33, wherein a relationship between the DC chrominance scaler and the quantization parameter $Q_p$ is given by Table 1.

35. The method of claim 33, wherein the DC chrominance value is a member of an intra coded block of video data.

36. The method of claim 33, further comprising receiving the quantization parameter and the DC chrominance value from a channel.

* * * * *

UNITED STATES PATENT AND TRADEMARK OFFICE
CERTIFICATE OF CORRECTION

PATENT NO. : 6,347,116 B1
DATED : February 12, 2002
INVENTOR(S) : Barin Geoffry Haskell, Atul Puri and Robert Louis Schmidt It is certified that error appears in the above-identified patent and that said Letters Patent is hereby corrected as shown below:

<u>Column 7,</u>
Line 62, the word -- and -- should be added after the word "scaler,".

<u>Column 8,</u>
Line 3, the word -- $Q_p$ -- should replace the word "$Q_2$".

<u>Column 9,</u>
Line 3, delete the word "an" after the word "from".
Line 45, the word -- $Q_p$ -- should be inserted after the word "parameter".
Line 5, the word -- falls -- should replace the word "fills".

<u>Column 10,</u>
Lines 16-17, delete the word "with" after the word "signal".
Line 53, the word -- $Q_p$ -- should be inserted after the word "parameter"

<u>Column 11,</u>
Line 31, the word -- codes -- should replace the word "coded".

<u>Column 12,</u>
Line 11, the word -- based -- should replace the word "bawd".

Signed and Sealed this

Sixteenth Day of July, 2002

*Attest:*

*Attesting Officer*

JAMES E. ROGAN
*Director of the United States Patent and Trademark Office*